Aug. 6, 1968  K. DEEG ET AL  3,395,473
SLIDE PROJECTOR

Filed Feb. 2, 1966  3 Sheets-Sheet 1

INVENTOR.
KARL DEEG
WILFRIED HOFMANN
BY
Michael S. Striker

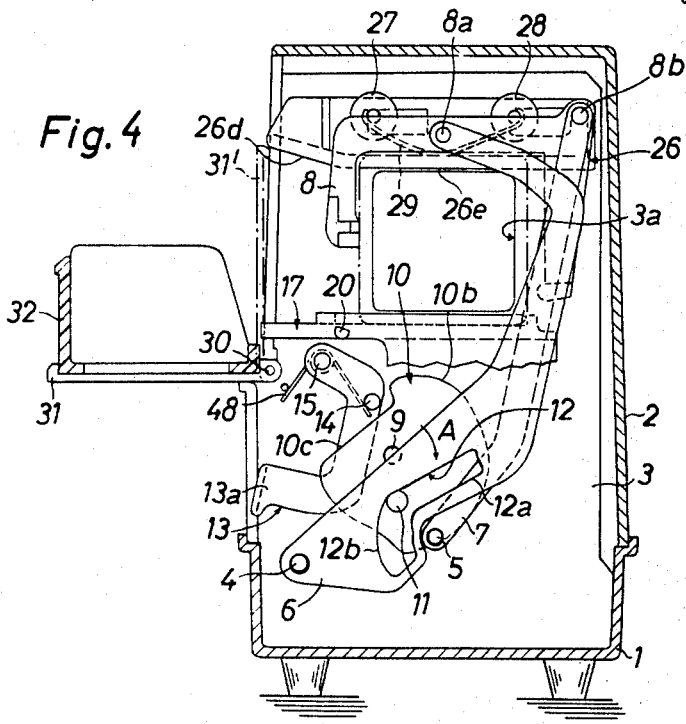
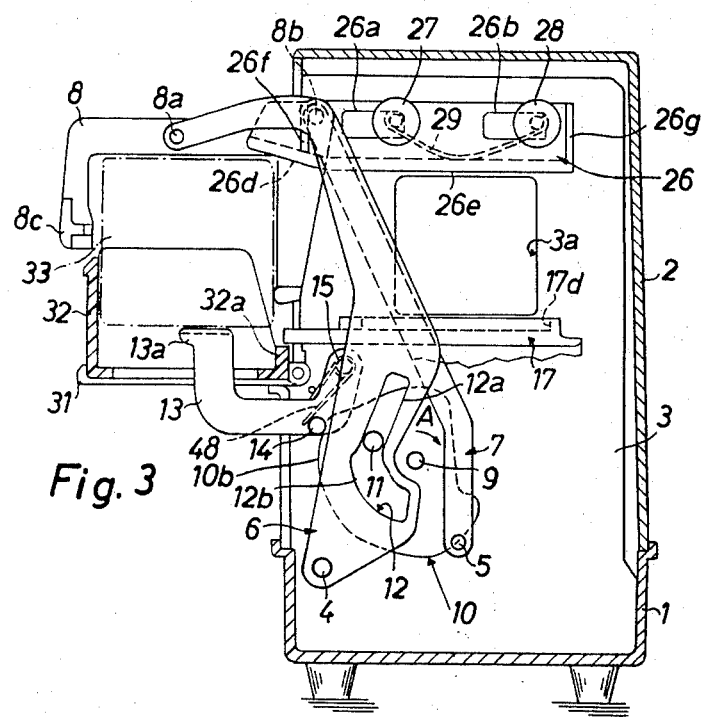

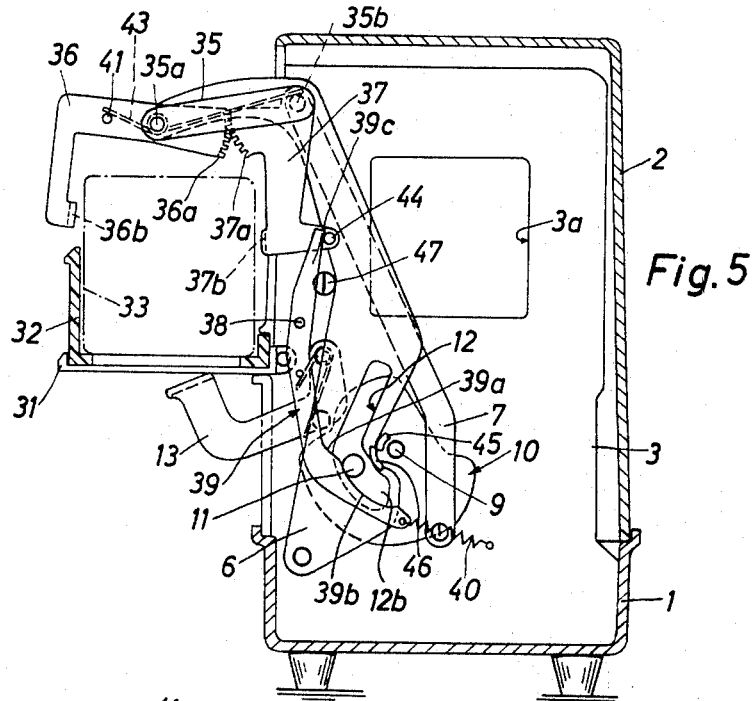
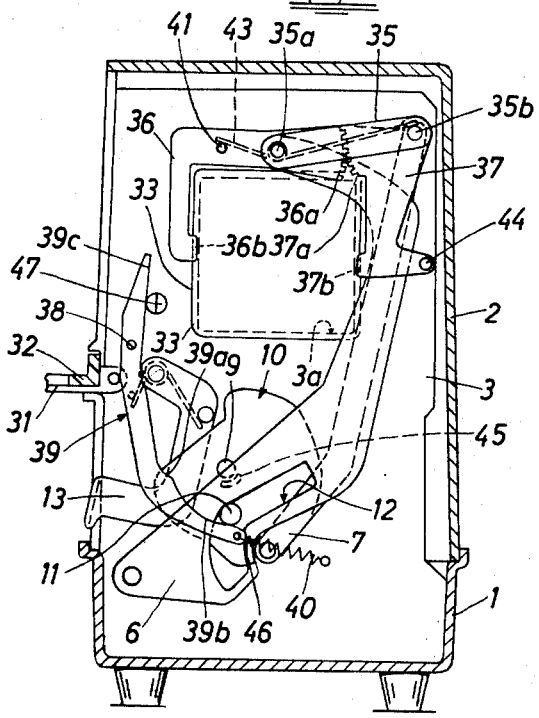

ary object of the instant invention is to pro-

United States Patent Office 3,395,473
Patented Aug. 6, 1968

3,395,473
SLIDE PROJECTOR
Karl Deeg, Unterhaching, near Munich, and Wilfried Hofmann, Munich, Germany, assignors to Agfa-Gevaert Aktiengesellschaft, Leverkusen, Germany
Filed Feb. 9, 1966, Ser. No. 526,150
Claims priority, application Germany, Feb. 26, 1965, A 48,511
19 Claims. (Cl. 40—79)

ABSTRACT OF THE DISCLOSURE

A slide projector wherein the gripper for slides is movable back and forth between extended and retracted positions by means of a parallel mechanism. The gripper transports slides without tilting and is fully concealed in the housing of the projector when moved to retracted position. The parts of the parallel mechanism are also concealed in the housing in retracted position of the gripper.

---

The present invention relates to slide projectors in general, and more particularly to improvements in slide projectors of the type wherein a gripper transfers slides between a magazine and a projection position.

In conventional slide projectors of the type to which our invention pertains, parts of the slide transferring unit extend beyond the outlines of the housing when the projector is not in use. This is undesirable because the projecting parts are likely to be damaged and also because the projector occupies too much room when not in actual use.

Accordingly, it is an important object of the present invention to provide a slide projector wherein the magazine transporting and slide transferring units may be fully concealed in the interior of the projector housing.

Another object of the invention is to provide a novel and improved assembly of slide supporting, transferring and retaining components which may be utilized in the above outlined projector to insure proper positioning of the slide in projection position.

A further object of the invention is to construct and assemble the slide transferring unit in such a way that all of its parts are fully concealed in the housing when a slide is moved to projection position so that it is not necessary to operate such mechanism for the express purpose of concealing the parts in the housing preparatory to placing the projector into storage.

A concomitant object of the invention is to provide a slide projector wherein the magazine for slides can be readily shifted by hand to place any selected slide into registry with the transferring unit.

Still another object of the invention is to provide a projector wherein the magazine is safely locked against unintentional displacement while a slide assumes a position in which the image on its film is projected onto a screen or the like.

A further object of the invention is to provide a very simple support for the slide magazine and to construct the support in such a way that it can be readily moved to a position in which it does not extend beyond the outlines of the projector housing.

An additional object of our invention is to provide a very simple drive which can actuate the slide transferring and magazine transporting units, either by hand or by means of a prime mover.

Another object of the invention is to provide a magazine transporting unit whose operation is synchronized with the operation of the slide transferring unit so that a single manipulation suffices to advance the magazine and to transfer a slide to and from the magazine.

An ancillary object of the instant invention is to provide a novel system of drive cams and followers which can transmit motion to the magazine transporting and slide transferring units.

Briefly stated, one feature of our invention resides in the provision of a slide projector which comprises a housing, a slide-containing magazine detachably supported by a portion of the housing for movement in parallelism with the optical axis of the lens system, and a slide transferring unit which comprises a one-piece or composite gripper movable from a retracted position in the interior of the housing to an extended position in which the gripper overlies a selected slide in the magazine, and a parallel mechanism for moving the gripper between such positions.

The magazine may be supported by a platform which constitutes a portion of a side wall of the housing and may be pivoted or otherwise displaced between an operative or supporting and an inoperative position. The drive which operates the parallel mechanism preferably comprises a single drive shaft which is journalled in the housing and which can be rotated back and forth, either by hand or by means of a motor, to transmit motion through a system of drive cams and followers.

The gripper is movable in a plane which is normal to the optical axis, i.e., which is normal to the direction of movement of the magazine, and the projector further comprises specially configurated and mounted slide lifting, slide supporting and slide retaining members which are operated in synchronism with the gripper to respectively raise a selected slide from its allocated space in the magazine, to support the thus raised slide during movement from the magazine to projection position or vice versa, and to retain the slide in projection position.

The unit which transports or advances the magazine receives motion from the drive shaft for the parallel mechanism and may be constructed in such a way that the magazine is locked in position while a slide assumes its projection position.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawings, in which:

FIG. 3 is a transverse vertical section similar to that of FIG. 1 and illustrates a slide in raised position just before the slide begins to leave the magazine;

FIG. 4 is a similar transverse section and illustrates the gripper in a fully retracted position while a slide is held from all sides in projection position;

FIG. 5 is a transverse vertical section through a modified slide projector showing a two-piece gripper in fully extended position; and FIG. 6 is a similar transverse vertical section through the modified projector and shows the gripper in fully retracted position.

Figure 1:
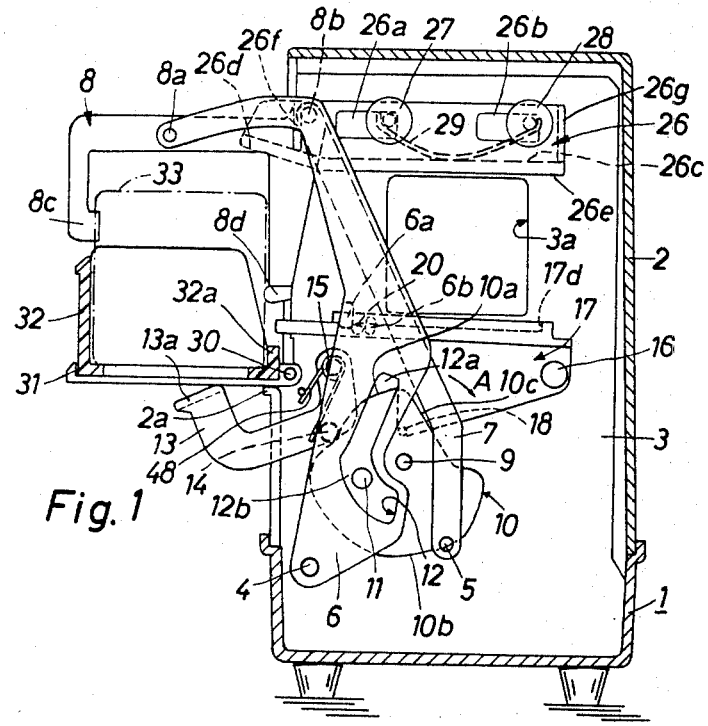
FIG. 1 is a transverse vertical section through a slide projector with a one-piece gripper which embodies one form of our invention, the gripper being shown in a fully extended position just before it causes a slide to move from the magazine to projection position.
Figure 2:
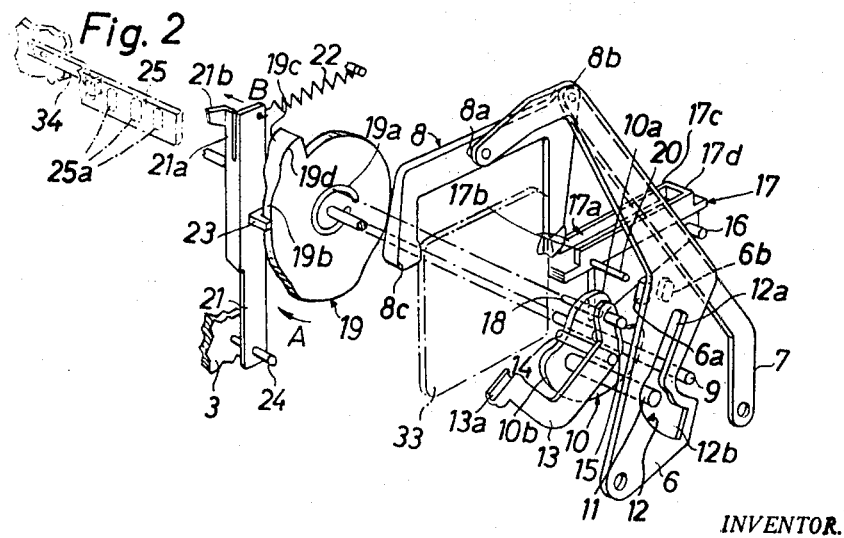
FIG. 2 is an exploded perspective view of the slide transferring and magazine transporting units in the slide projector of FIG. 1.

Referring first to FIGS. 1 and 2, there is shown a slide projector which comprises a housing having a lower section or base 1 and an upper section 2 which is fitted into the base. The housing accommodates a transversely extending vertical partition 3 which supports two spaced horizontal pivot pins 4 and 5. These pins respectively support two links 6 and 7 which form part of a parallel mechanism. Pivot pins 8a and 8b connect the upper ends of the links 6, 7 with an inverted U-shaped gripper 8 which is made of one piece and constitutes the upper ruler of the parallel mechanism, the lower ruler being constituted by that part of the partition 3 which supports the pins 4 and 5. When the links 6 and 7 are caused to pivot about the pins 4, 5, the gripper 8 performs a translatory movement and can be shifted between a retracted position which is shown in FIG. 4 and an extended position shown in FIG. 1.

The partition 3 further supports a drive shaft 9 which is parallel with the pins 4, 5, 8a, 8b and is fixedly connected with a disk-shaped drive cam 10 serving to rock the links 6, 7 between the positions shown in FIGS. 1 and 4. The cam 10 carries a pin-shaped follower 11 which is received in a specially configured cam groove 12 machined into an enlarged lower portion of the link 6. The cam groove 12 comprises a slot-shaped upper portion 12a of constant width which can receive the follower 11 with minimal clearance and a relatively wide lower portion 12b which permits limited lateral movements of the follower. In other words, when the follower 11 extends into the lower cam slot portion 12b, the link 6 has a certain freedom of movement with reference to the follower.

The peripheral cam face of the cam 10 comprises three specially configured cam face sections 10a, 10b and 10c which can be tracked by a second pin-shaped follower 14 provided on a slide lifting lever 13. The latter is rockable on a pivot pin 15 and is biased by a torsion spring 48 which urges the follower 14 against the face of the cam 10. The pin 15 is mounted on the partition 3. A further pivot pin 16, which is also journalled in the partition 3, carries a supporting lever 17 whose upper edge portion defines an elongated guide groove 17a bounded by upwardly extending lateral flanges 17b, 17c and having its inner (right-hand) end closed by an upwardly extending stop 17d. The lever 17 carries a pin-shaped follower 18 which extends into a specially configured cam groove 19a machined into one face of a second substantially disk-shaped drive cam 19 fixedly mounted on the drive shaft 9. The cam 19 can impart to the lever 17 a rocking movement to place a locating post 20 of the lever 17 into the gap between two blocking projections 6a, 6b provided on the link 6.

The cam 19 comprises a circumferential cam face 19b and a second cam face 19c. These cam faces will be respectively referred to as radial and axial cam faces because they can cause a magazine transporting member 21 to respectively move radially and axially of the drive cam 19. The transporting member 21 is mounted on a pivot pin 24, which is carried by the partition 3, and is biased by a helical contraction spring 22 which tends to maintain a bent-over follower 23 of the member 21 in abutment with the radial cam face 19b. The member 21 may be constituted by a leaf spring which is mounted in such a way that the follower 23 simultaneously tends to track the axial cam face 19c. The general plane of the transporting member 21 is parallel with the plane of the drive cam 19 so that the member 21 may be flexed in a sense to move axially toward and away from this cam, such movements of the member 21 being utilized to advance a detachable slide magazine or tray 32. A motion transmitting projection or tooth 21b of the transporting member 21 can enter one of a series of recesses or notches 25a provided in a rail 25 which is attached to or forms part of the magazine 32. The tooth 21b forms part of an upwardly extending bent-over resilient lip 21a of the transporting member 21.

The partition 3 defines a projection window 3a which registers with the visible portion of the film in a slide 33 when the gripper 8 is moved to the retracted position of FIG. 4. At a level above the window 3a, there is provided a runner-shaped spring-biased retaining or holding member 26 which can engage from above the frame of that slide 33 which has been moved into a projection position of registry with the window 3a. The retaining member 26 is formed with two elongated horizontal guide slots 26a, 26b which receive the stems of two guide bolts or rivets 27, 28 secured to the partition 3. The height or width of the guide slots 26a, 26b exceeds the diameters of the bolts 27, 28 so that the retaining member 26 can move back and forth horizontally as well as vertically. A horizontal stop shoulder 26c of the retaining member 26 is engaged by the median portion of a prestressed resilient element here shown as a leaf spring 29 whose ends are secured to the bolts 27, 28 and whose function is to bias the retaining member downwardly, namely, toward the window 3a and against the upper edge face of a slide 33 which has been placed into registry with the window. The outer or left-hand portion or extension 26d of the retaining member 26 is inclined upwardly and outwardly so that it provides a tapering bottom surface which can be engaged by the frame of a slide 33 when the latter is being transferred from its allocated space in the magazine 32 into registry with the window 3a. During such transfer of the slide 33 to projection position, the retaining member 26 rises against the bias of the spring 29 and presses the slide against the supporting lever 17. The upper edge face of the slide is then engaged by the underside 26e of the retaining member 26. This member 26 further carries a pair of spaced motion receiving projections 26f, 26g which are disposed at the opposite sides of the pivot pin 8b. When the gripper 8 is moved to the extended position of FIG. 1, the pin 8b engages the projection 26f and shifts the retaining member 26 in a direction to the left to a first end position and to the extent determined by the length of the guide slots 27, 28. On its way back to the position of FIG. 3, the pin 8b engages the projection 26g and returns the retaining member 26 to the second end position of FIG. 4. In the position of FIG. 1, the extension 26d is immediately adjacent to and can actually engage a slide which is still accommodated in the magazine 32.

The left-hand side wall of the upper housing section 2 comprises a hinged portion or flap 31 which constitutes a supporting platform for the magazine 32 and may be pivoted between the operative or supporting position of FIG. 1 and a closed position 31' (see FIG. 4) in which it closes a cutout in the side wall. The pintle of the hinge for the platform 31 is shown at 30. A stop 2a of the side wall arrests the platform 31 in the latter's operative or supporting position shown in FIGS. 1, 3 and 4. The magazine 32 is movable back and forth in parallelism with the optical axis of the lens system which is not shown in the drawings. When moved to the closed position 31', the platform 31 may be retained by a permanent magnet, by a snap fastener or by any other suitable locking or holding device which is not shown in the drawings. The projector then resembles a block-shaped body and its slide transferring and magazine transporting units are fully concealed in the interior of the housing.

The operation of the improved slide projector is as follows:

To start the projection of the first image, the drive shaft 9 is rotated by hand or by means of an electric motor (not shown) to move the gripper 8 to the extended position of FIG. 1. The head 13a of the lifting lever 13 is located at a level below the magazine 32 and the follower 14 of the lever 13 tracks the cam face section 10a. Thus, the path of the magazine 32 is free and the operator can shift the latter to a position in which the foremost slide or another selected slide 33 is located in the plane of the gripper 8. This plane is normal to the optical axis. The operator's hand or the motor then rotates the drive shaft 9 in a direction as indicated by arrows A whereby the follower 14 of the lifting lever 13 tracks the cam face section 10b. The head 13a of the lever 13 engages the lower edge face of the selected slide 33 and lifts the latter from its slot in the magazine 32 until the slide 33 reaches the raised position of FIG. 3. In such raised position, the lower edge face of the slide 33 is located at a level above a relatively low side wall 32a of the magazine. The purpose of the side wall 32a is to normally maintain the slide 33 in exact registry with each other slide in the magazine 32. Also, the side wall 32a prevents lateral movements of the slides when the magazine 32 is tilted. It is clear that the bottom part, or at least a portion of the bottom part, of the magazine 32 is opened or slotted so that the head 13a of the lifting lever 13 can enter the interior of the magazine while moving from the position of FIG. 1 to that shown in FIG. 3. When in the position of FIG. 3, the lower edge face of the raised slide 33 is aligned with the groove 17a of the supporting lever 17. Thus, only a simple translatory, substantially straight-line movement is necessary to move the raised slide into registry with the window 3a. During transfer of the raised slide 33 into registry with the window 3a, the groove 17a is closely adjacent to the magazine 32 so that it may receive the lower edge portion of the slide well before this lower edge portion slides off the head 13a of the lifting lever 13.

While the lifting lever 13 moves from the position of FIG. 1 to that of FIG. 3, the follower 11 of the drive cam 10 remains in the relatively wide portion 12b of the cam slot 12 so that rotation of the cam 10 with the drive shaft 9 does not cause any displacement of the links 6 and 7. Thus, the gripper 8 remains in the extended position (compare FIGS. 1 and 3). The configuration of the groove 19a in the second drive cam 19 is such that the supporting lever 17 is lifted while the lifting lever 13 moves from the position of FIG. 1 to that of FIG. 3. As shown in FIG. 3, the lever 17 is ready to support the raised slide 33 and its locating post 20 is then received between the blocking projections 6a, 6b of the link 6. The link 6 is locked in its momentary angular position.

As the shaft 9 continues to rotate in the direction indicated by the arrows A and the drive cams 10, 19 assume the positions shown in FIG. 3, the groove 17a of the supporting lever 17 is located in a horizontal plane and is in an optimum position to accommodate the lower edge portion of the raised slide 33. At the same time, the locating post 20 moves away from the blocking projections 6a, 6b so that the link 6 can be rocked by the follower 11 which then enters the relatively narrow cam slot portion 12a. The shaft 9 continues to rotate (arrows A) so that the follower 11 rocks the link 6 (and hence also the link 7) whereby the gripper 8 leaves the extended position of FIG. 3 and moves toward the retracted position of FIG. 4. A nose 8c on the left-hand jaw of the gripper 8 engages the left-hand lateral edge face of the raised slide 33 and pushes the slide along the extension 26d of the retaining member 26 whereby the member 26 rises against the bias of the spring 29 and its underside 26e bears against the upper edge face of the slide to press it against the supporting lever 17. The raised slide is held against twisting or turning because its lower edge portion is accommodated in the groove 17a. Shortly before the gripper 8 reaches its fully retracted position, the pivot pin 8b engages the motion receiving projection 26g and pushes the retaining member 26 all the way to the second end position shown in FIG. 4. The right-hand lateral edge face of the slide 33 then abuts against the stop 17d of the supporting lever 17 and the film in the slide is in accurate registry with the window 3a. In such projection position, the slide 33 is positively engaged from all four sides, namely, by the supporting lever 17 from below, by the spring-biased retaining member 26 from above, by the nose 8c of the gripper 8 from the left-hand side, and by the stop 17d of the lever 17 from the right-hand side.

During the last stage of translatory movement of the gripper 8 to the retracted position of FIG. 4, the follower 14 of the lifting lever 13 tracks the cam face section 10c of the cam 10 so that the spring 48 is free to bias the lever 13 to the position shown in FIG. 4 in which the lever is fully retracted into the housing and cannot interfere with forward or backward movement of the magazine 32. The components of the slide transferring and magazine transporting units assume the positions shown in FIG. 4 when a slide 33 is held in projection position (i.e., in registry with the window 3a) and also when the projector is not in use. It will be seen that the two units are then fully concealed in the housing so that the platform 31 may be pivoted upwardly to the position 31' in order to close the opening in the side wall of the housing as soon as the magazine 32 is removed. The improved projector then occupies just as much space as is needed for its housing 1, 2.

In order to move the next slide 33 to the projection position, the operator or the motor rotates the drive shaft 9 in the opposite direction, i.e., in a counterclockwise direction as the parts appear in FIGS. 1 to 4. The gripper 8 is thereby moved to the extended position of FIG. 1 and a pusher 8d thereon shifts the slide 33 in a direction to the left and back into accurate alignment with the corresponding slot in the magazine 32. Once the slide returns to the raised position of FIG. 1, and in response to further anticlockwise rotation of the shaft 9, the lever 13 descends and the head 13a of this lever deposits the slide in its slot to the left of the side wall 32a. In the last stage of movement of the gripper 8 to the extended position of FIG. 1, the pivot pin 8b engages the motion receiving projection 26f and pushes the retaining member 26 in a direction to the left until the extension 26d reassumes the first end position shown in FIG. 1. As the shaft 9 continues to rotate in a direction counter to that indicated by the arrows A, the follower 23 tracks the radial cam face 19b to move the tooth 21b into one of the notches 25a. The drive cam 19 thereupon causes the follower 23 to track the axial cam face 19c whereby the tooth 21b advances the magazine 32 by a step and places the next slide 33 into the plane of the gripper 8. Such movement of the magazine 32 takes place in the direction indicated in FIG. 2 by arrow B. The projector preferably comprises a yieldable arresting or positioning member 34 which resembles a leaf spring one end of which is attached to the housing. The other end of the spring 34 is bent to resemble a pallet which can ratchet along the rail 25 when the magazine 32 is shifted by hand or by the tooth 21b and falls into one of the notches 25a when a slide 33 registers with the gripper 8.

Shortly before the shaft 9 returns the gripper 8 to the extended position of FIG. 1, the radial cam face 19b of the cam 19 allows the follower 23 to move toward the axis of the cam 19 and to retract the tooth 21b from the registering notch 25a. The transporting member 21a has some energy stored and moves the tooth 21b in a direction counter to that indicated by the arrow B to place this tooth into registry with the next-following notch 25a. Finally, and at the time the gripper 8 actually reaches the extended position of FIG. 1, a further radial cam 19d causes the tooth 21b to enter the adjoining notch 25a and to thereby lock the magazine 32 in position. This insures that the magazine 32 is not accidentally shifted while the image on the film of the slide 33 which registers with the window 3a is being projected onto a screen or the like. Thus, the magazine may be locked by the leaf spring 34 and by the tooth 21b.

A very important advantage of the improved drive which includes the shaft 9 and the cams 10, 19 is that its operation is practically noiseless and that the wear on the cooperating parts is negligible. Furthermore, the faces of the cams 10, 19 can be readily configurated in such a way that they impart necessary movements to a plurality of followers and that the gripper 8 remains idle while the magazine 32 is transported or advanced by a step to place the next slide into registry with the gripper. The acceleration of parts which receive motion from the cams 10, 19 is uniform. The locating post 20 is engaged by the blocking projections 6a, 6b at a stage of operation (while the cam 19 causes the magazine 32 to advance by a step) when the transmission of motion to the parallelogram mechanism would have taken place at a less than optimum angle. The drive transmits motion to the parallelogram mechanism during a relatively long stage of rotation of the shaft 9 and while such transmission of motion requires little effort. This is particularly important when the shaft 9 is rotated by hand, preferably through the intermediary of one or more pushbuttons or the like.

FIGS. 5 and 6 illustrate a modified slide projector wherein the upper end portions of the links 6 and 7 are connected to each other by a horizontal link or ruler 35 so that the parts 6, 7, 35 and the partition 3 again constitute a parallel mechanism. The pivot pins 35a, 35b correspond to the pins 8a, 8b and serve to couple the ruler 35 with the links, 6, 7, respectively. These pins 35a, 35b respectively support two relatively movable jaws 36, 37 of a composite or two-piece gripper, and the jaws have intermeshing toothed segments 36a, 37a which compel them to pivot in opposite directions. A spring 43 serves to bias the jaws 36, 37 and is led around the pins 35a, 35b as well as along a stop pin 41 mounted on the jaw 36. The spring 43 tends to close the gripper, i.e., to move the slide-engaging portion 36b, 37b of the jaws toward each other. When the jaws 36, 37 and free to follow the bias of the spring 43, their portions 36b, 37b respectively engage the left-hand and right-hand lateral edge faces of a slide 33 and clamp the slide therebetween.

The partition 3 supports a pivot pin 38 for a two-armed actuating lever which is biased by a spring 49 and tends to pivot in a counterclockwise direction, as viewed in FIGS. 5 and 6. A first cam face 39a on the lower arm of the actuating lever 39 extends into the path of the follower 11 on the drive cam 10. A second cam face 39b on the lower arm of the lever 39 is configured in such a way that the latter need not change its angular position when the follower 11 travels in a counterclockwise direction (while a slide 33 is being returned into the magazine 32 and while the magazine is being advanced by a step in a manner as described in connection with FIGS. 1 to 4). During this phase of operation, the actuating lever 39 remains idle. The upper arm 39c of the lever 39 then abuts against a motion receiving follower portion 44 on the jaw 37 to maintain the gripper in the open position shown in FIG. 5.

When the follower 11 of the cam 10 extends into the relatively wide portion 12b of the cam slot 12 in the link 6, an arcuate projection 45 of the drive cam 10 slides along a complementary arcuate projection 46 of the link 6. Therefore, the link 6 is locked in position by being held in abutment with a fixed stop pin 47 despite the fact that it cannot receive motion from the follower 11.

Otherwise, the operation of the slide projector shown in FIGS. 5 and 6 corresponds in all respects to that of the previously described projector. All such component parts of the second projector which are identical or obviously analogous to the corresponding parts of the projector shown in FIGS. 1 to 4 are identified by the same numerals. FIG. 6 shows the jaws 36, 37 in fully retracted positions in which the slide transferring and magazine transporting units are fully accommodated in the interior of the housing 1, 2 and the platform 31 can be pivoted upwardly as soon as the magazine 32 is removed. The lifting lever 13 is also retracted into the housing so that all components of the two units are protected against damage and that the projector occupies little room when put into storage or during transportation to and from storage or to and from different locales of actual use. The housing is preferably provided with one or more handles (not shown) to facilitate transportation.

The projector of FIGS. 5 and 6 can operate properly without a retaining member (such as the member 26) and/or without a supporting lever (such as the lever 17) because the jaws 36, 37 are biased by the spring 43 and can properly retain a slide 33 when the latter registers with the window 3a.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a slide projector, a housing; a magazine detachably supported by said housing; and a slide transferring unit comprising a gripper movable between a retracted position in which it is fully concealed in said housing and an extended position in which it overlies a selected slide in said magazine, moving means mounted in said housing for effecting translatory movements of the gripper between said positions so that the orientation of slides during travel with said gripper remains substantially unchanged, said moving means being fully concealed in said housing in retracted position of said gripper, and independent movable lifting means for lifting said selected slide in said magazine in synchronism with movement of said gripper so that the selected slide is lifted when said gripper moves from extended position.

2. A structure as set forth in claim 1, wherein said magazine is externally adjacent to said housing and is movable in parallelism with the optical axis of the projector, said gripper being movable in a plane which is normal to the optical axis.

3. A structure as set forth in claim 2, further comprising a magazine transporting unit and a common drive for said lifting means and said units.

4. A structure as set forth in claim 3, wherein said drive comprises a single drive shaft which is rotatable in said housing.

5. A structure as set forth in claim 2, further comprising a magazine transporting unit and a common drive for said units, said drive comprising a drive shaft journaled in said housing and rotatable in a first direction to move said gripper to extended position and in a second direction to move said gripper to retracted position.

6. A structure as set forth in claim 5, wherein said gripper resembles a one-piece body of inverted U-shape.

7. A structure as set forth in claim 1, wherein said gripper comprises two relatively movable jaws each of which is arranged to grip one lateral edge face of a slide and resilient means for biasing said jaws into engagement with the respective edge faces, said moving means comprising a pair of links having lower end portions pivotally supported by said housing and upper end portions, a ruler adjacent to the upper end portions of said links, and a pair of pivot pins connecting said ruler with said upper end portions, each of said jaws being pivotally supported by one of said pins.

8. In a slide projector, a housing; a magazine detachably supported by said housing, said magazine being externally adjacent to said housing and being movable in parallelism with the optical axis of the projector; a slide transferring unit comprising a gripper movable in a plane which is normal to the optical axis between a retracted position in which the gripper is fully concealed in the interior of said housing and an extended position in which the gripper overlies a selected slide in said magazine, and a parallel mechanism mounted in said housing for moving said gripper between such positions; lifting means for raising a selected slide from the magazine prior to movement of said gripper from extended position; and a slide retaining member located in said plane and movable in said housing between a first position nearer to said magazine and a second position corresponding to retracted position of said gripper, said parallel mechanism comprising motion transmitting means for moving said retaining member between said first and second positions in response to movement of said gripper between said extended and retracted positions.

9. A structure as set forth in claim 8, wherein said retaining member is located above the path of a slide and further comprising resilient means for biasing said retaining member against the upper edge face of a slide subsequent to raising of such slide from the magazine and upon transfer of the thus raised slide to a projection position corresponding to the retracted position of said gripper.

10. A structure as set forth in claim 9, wherein said retaining member comprises two spaced motion receiving projections and said motion transmitting means comprises a pivot pin located between said projections.

11. In a slide projector, a housing; a magazine detachably supported by said housing, said magazine being externally adjacent to said housing and being movable in parallelism with the optical axis of the projector; a slide transferring unit comprising a gripper movable in a plane which is normal to the optical axis between a retracted position in which the gripper is fully concealed in the interior of said housing and an extended position in which the gripper overlies a selected slide in said magazine, and a parallel mechanism mounted in said housing for moving said gripper between such positions, said parallel mechanism comprising a pair of links pivotally mounted in said housing and pivotally supporting said gripper for translatory movement between said extended and retracted positions, one of said links having a cam slot; lifting means for raising a selected slide from the magazine prior to movement of said gripper from extended position; a magazine transporting unit; and a common drive for said lifting means and said units, said drive comprising a single drive shaft which is rotatable in said housing, cam means mounted on and rotatable with said drive shaft, a first follower provided on said cam means and extending into said cam slot to transmit motion to said parallel mechanism, a second follower provided on said lifting means and arranged to track said cam means to thereby operate said lifting means in synchronism with said gripper, and a third follower provided on said magazine transporting unit and arranged to track said cam means to advance said magazine in stepwise fashion.

12. A structure as set forth in claim 11, wherein said cam slot comprises a first portion which snugly receives said first follower when the drive shaft moves said gripper and a second portion which receives said first follower with clearance when the drive shaft advances said magazine.

13. A structure as set forth in claim 12, further comprising locating means for blocking said parallel mechanism when said first follower extends into said second portion of said cam slot.

14. A structure as set forth in claim 13, further comprising a supporting member provided in said housing for propping the lower edge face of a slide in retracted position of said gripper, said locating means comprising a post provided on said supporting member and said parallel mechanism comprising a pair of blocking projections disposed at the opposite sides of said post when said first follower is received in the second portion of said cam slot.

15. A structure as set forth in claim 13, further comprising a supporting member movably supported by and located in said housing for propping the lower edge face of a slide in the retracted position of said gripper and further comprising a fourth follower provided on said supporting member and arranged to track sai dcam means and to move said supporting member while said gripper approaches and leaves its retracted position.

16. In a slide projector, a housing; a magazine detachably supported by said housing; and a slide transferring unit comprising a gripper movable between a retracted position in which the gripper is fully concealed in the interior of said housing and an extended position in whch the gripper overlies a selected slide in said magazine, said gripper comprising two relatively movable jaws each of which is arranged to grip one lateral edge face of a slide and resilient means for biasing said jaws into engagement with the respective edge faces, said jaws comprising intermeshing toothed sections arranged to pivot said jaws in opposite directions and said unit further comprising a parallel mechansm mounted in said housing for moving said gripper between such positions.

17. A structure as set forth in claim 16, further comprising drive means for operating said parallel mechanism including a rotary drive shaft, cam means provided on said shaft, a follower carried by said cam means and extending into a cam slot provided in a component of said parallel mechanism, said cam slot having a portion which receives said follower with clearance to permit rotation of said cam means while said parallel mechanism is idle, and an actuating member mounted in said housing and arranged to pivot said jaws in response to rotation of said cam means.

18. A structure as set forth in claim 17, wherein said actuating member is a two-armed lever which is rockable in said housing, said lever having a first arm provided with a cam face arranged to track said follower and a second arm arranged to engage a portion of one of said jaws.

19. In a slide projector, a housing; a magazine detachably supported by said housing; and a slide transferring unit comprising a gripper movable between a retracted position in which it is fully concealed in the interior of the housing and an extended position in which it overlies a selected slide in said magazine, and moving means mounted in said housing for effecting translatory movements of the gripper between said positions so that the orientation of slides during travel with said gripper remains substantially unchanged, said moving means being fully concealed in said housing in retracted position of said gripper and including a first pair of pivots on said housing, a second pair of pivots on said gripper, and a pair of links each connecting one of said first pair of pivots with one of said second pair of pivots.

References Cited

UNITED STATES PATENTS

| 2,878,604 | 3/1959 | Mulch | 40—79 |
| 3,079,840 | 3/1963 | McMaster et al. | 40—79 X |
| 3,120,150 | 2/1964 | Brown | 40—79 X |
| 3,171,222 | 3/1965 | Sakaki et al. | 40—79 |
| 3,174,395 | 3/1965 | Krull | 40—79 X |
| 3,233,511 | 2/1966 | Deeg et al. | 40—79 X |

EUGENE R. CAPOZIO, *Primary Examiner.*

R. CARTER, *Assistant Examiner.*